United States Patent [19]
Ross, Sr.

[11] 3,826,880
[45] July 30, 1974

[54] ELECTRIC POWER TRANSMISSION SYSTEM

[75] Inventor: Donald R. Ross, Sr., Pittsburgh, Pa.

[73] Assignee: U-S Safety Trolley Corporation, Pittsburgh, Pa.

[22] Filed: May 25, 1973

[21] Appl. No.: 364,016

[52] U.S. Cl. .................. 191/25, 191/30, 191/59.1
[51] Int. Cl. ............................................. B60m 1/04
[58] Field of Search ............. 191/30, 22, 23, 25, 28, 191/29, 31, 40, 45, 46, 47–50, 59, 59.1

[56] References Cited
UNITED STATES PATENTS

| | | | |
|---|---|---|---|
| 840,087 | 1/1907 | Pealow | 191/49 |
| 941,151 | 11/1909 | Kozesnik | 191/49 |
| 3,042,761 | 7/1962 | Mayer | 191/59.1 |
| 3,321,587 | 5/1967 | Ross | 191/23 R |
| 3,439,131 | 4/1969 | Ross, Jr. | 191/25 |
| 3,439,132 | 4/1969 | Weber | 191/59.1 |
| 3,543,893 | 12/1970 | Ross et al. | 191/40 |

Primary Examiner—M. Henson Wood, Jr.
Assistant Examiner—Richard A. Bertsch
Attorney, Agent, or Firm—Brown, Murray, Flick & Peckham

[57] ABSTRACT

An overhead metal trolley rail has a head for supporting it, separated by a vertical web from a foot that projects from opposite sides of the web and has a transversely curved lower contact surface. Slidable along the rail is a trolley shoe formed from a block of electrical conducting material, the upper portion of which has a longitudinal trough in it receiving the foot of the rail. The lower portion of the trough is curved transversely to engage the rail, and the opposite sides of the upper portion of the trough project toward each other above the foot of the rail to prevent separation of the shoe from the rail.

1 Claim, 3 Drawing Figures

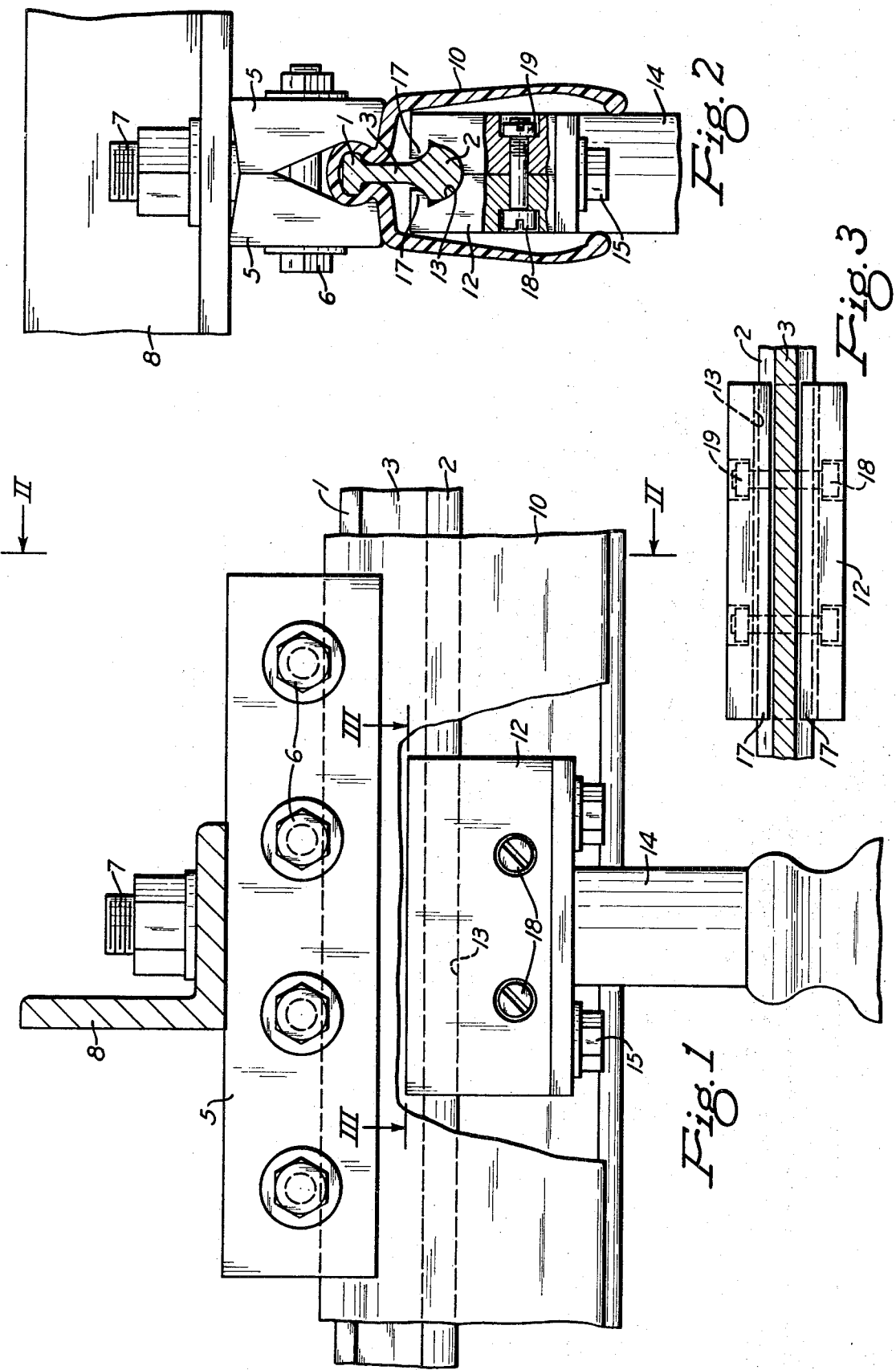

ELECTRIC POWER TRANSMISSION SYSTEM

Traveling cranes obtain their electric power through cables connected to trolley wheels or shoes that move along overhead electrical conductors, such as trolley wires or rails. The same type of system may be used in supplying electric current to other electrical equipment that must move around. Sometimes the electrical conductor along which a trolley shoe slides is merely a wire. In other cases it may be a flexible conductor but provided with a head running along its top for gripping by hangers that support the conductor. Such a conductor may be more accurately called a rail. The shoe that slides along such a conductor has a trough in its upper portion for receiving the wire or rail. The trough serves to guide the shoe along the conductor by preventing them from moving laterally relative to each other. To hold the shoe up tight against the conductor the trolley pole is provided with a spring that exerts upward pressure against the shoe. In many cases this is sufficient to prevent the separation of the shoe from the wire or rail. However, there are situations in which such separation can and does occur. For example, if an overhead crane is being used in the open, high winds may cause the trolley conductor to swing and whip around so that the trolley shoe is thrown out of engagement with it. Putting the shoe back on the track can be difficult and time-consuming. Various solutions to this problem have been suggested, but they are either inadequate or complicatied or involve moving parts.

It is among the objects of this invention to provide an electric power transmission system of the type just discussed, in which a trolley shoe is used that cannot separate accidentally from the electrical conductor that it slides along, and in which the shoe is of simple and inexpensive unitary construction.

The preferred embodiment of the invention is illustrated in the accompanying drawings, in which FIG. 1 is a fragmentary side view of a trolley conductor and guard, with part of the guard broken away to show the trolley shoe in elevation;

FIG. 2 is a vertical section taken on the line II—II of FIG. 1; and

FIG. 3 is a horizontal section taken on the line III—III of FIG. 1.

Referring to the drawings, an overhead trolley rail is formed from any desired length of metal suitable for conducting electricity, such as copper. The rail has a head 1 and a foot 2 extending throughout its length. They are separated by a vertical web 3 that is integral with them. The web and head together have a T-shape in cross secton. The rail is suspended from hangers located at spaced intervals along its length. Each hanger is in the form of a clamp formed from two blocks 5 of electrical insulating material that are connected together by horizontal bolts 6. As shown in FIG. 2, the inner faces of these blocks diverge downwardly and then curve inwardly toward each other to form jaws that extend beneath the head of the rail for supporting it. A bolt 7 extends upwardly from the center of the hanger for fastening the hanger to a rigid support 8 above it.

The foot of the rail projects from opposite sides of the web above it and has a transversely curved lower contact surface. This surface may extend through an arc of 180° or more, and its upper edges are connected by concave surfaces with the web, into which they merge. The web of the rail spaces the foot far enough from the head to locate the foot a considerable distance beneath the upper portion of a tubular guard 10 that extends along the rail, which it encloses. This quard is made of a flexible rubber-like material and is supported by the rail. The upper portion of the guard extends downwardly on opposite sides of the head of the rail and then outwardly across the bottom of the hanger and then down. The bottom of the guard is split lengthwise throughout its length to provide it with lower edges that normally engage or overlap.

Slidably mounted on the rail inside the tubular guard is a trolley shoe. The shoe is an elongated block 12 of electrical conducting material, such as copper or graphite or a mixture of both, and the upper part of the block is provided with a central trough 13 that extends throughout the length of the block. The lower portion of the trough is curved transversely to engage and more or less fit the curved contact surface of the rail, with the sides of the trough extending up the opposite sides of the rail foot. The trough guides the block as it is moved along the rail so that it cannot slide sideways away from the rail. The shoe is supported on the upper end of a tubular spreader 14 fastened by screws 15 to the bottom of the shoe. An electric cable (not shown) extends from the shoe down through the spreader.

It is a feature of this invention that because of the trolley rail shape the shoe can be locked onto the rail so that they cannot separate from each other by relative vertical movement in opposite directions. Accordingly, the opposite sides 17 of the upper portion of the shoe trough 13 extend toward each other above the foot of the rail; they overlie the foot at opposite sides of rail web 3. Since the distance between these inwardly projecting sides of the trough is less than the width of the foot of the rail, there is no possibility of the shoe moving down away from the rail or of the rail moving upwardly away from the shoe. Consequently, they are locked together. Preferably, the opposite sides 17 of the upper portion of the trough have transversely convex surfaces that conform to some extent to the curvature of the concave surfaces that join the foot of the rail to its web. Initially, rail web 3 spaces the top of the shoe below the laterally extending portions of guard 10 above it. This allows the rail to wear down into the shoe until the top of the shoe starts to rub against the guard above it.

The relatively narrow top of the trough in the shoe does not allow the shoe to be moved up over the foot of the rail when the shoe is being applied to it, so one way of applying the shoe to the rail is to insert it over one end of the rail. Since this is not always convenient or possible, it is preferred to make the shoe in two parts by dividing block 12 along a central vertical plane extending lengthwise of it. These two parts are normally held together by screws 18 extending through them. The heads and the nuts 19 on the screws may be countersunk in the sides of the block. By loosening these screws, the top of the trough can be spread apart far enough to permit the trolley shoe to be slipped up over the rail and then the screws can be tightened to firmly connect the two parts of the block together. The shoe then cannot be removed from the rail without first loosening the screws or sliding it off one end of the rail.

It will be seen that in the electric power transmission system disclosed herein the trolley shoe cannot separate from the trolley rail accidentally, and yet the shoe is of very simple and inexpensive construction. It also is free of any parts that have to move out of the way in order for the shoe to pass the rail hangers. Yet, it is a simple matter to apply the shoe to the rail or to remove it therefrom.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electric power transission system comprising an overhead metal trolley rail having a head and a foot separated by a vertical web integral therewith, the head being adapted to be gripped by hangers for supporting the rail, said foot projecting from opposite sides of the web and having a transversely curved lower contact surface, the opposite sides of said rail foot above its curved lower surface curving inwardly and upwardly into said web, and a trolley shoe slidable along the rail and formed from an elongated block of electrical conducting material extending lengthwise of the rail, the upper portion of the block having a central trough therein extending from end to end of the block and receiving said foot of the rail, the lower portion of the trough being curved transversely to engage said contact surface of the rail, and the opposite sides of the upper portion of the trough projecting toward each other above said foot of the rail to prevent separaton of the shoe from the rail, said opposite sides of the upepr portion of the trough having tansversely convex surfaces adjacent said curved opposite sides of said rail foot.

* * * * *